May 24, 1932.   R. B. TAYLOR ET AL   1,859,724
JUICE DISTRIBUTOR
Filed Jan. 6, 1930
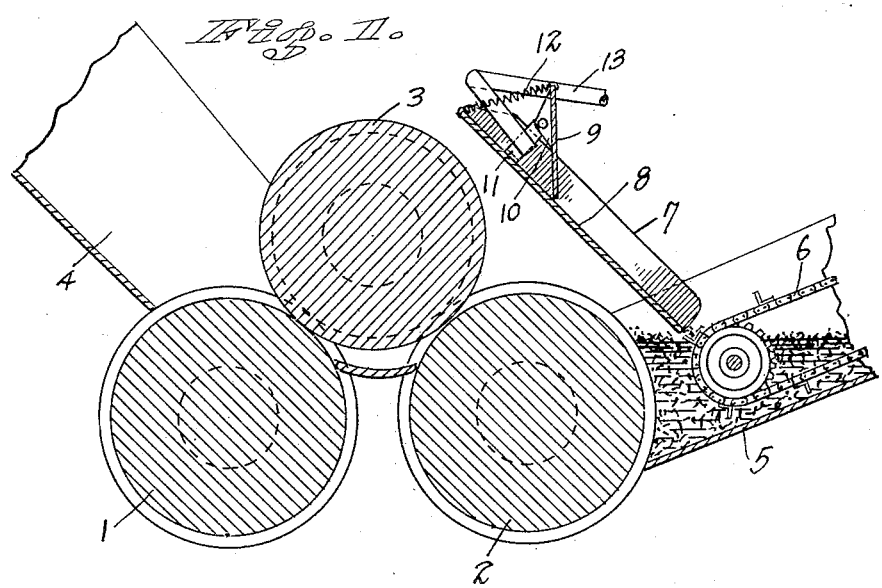
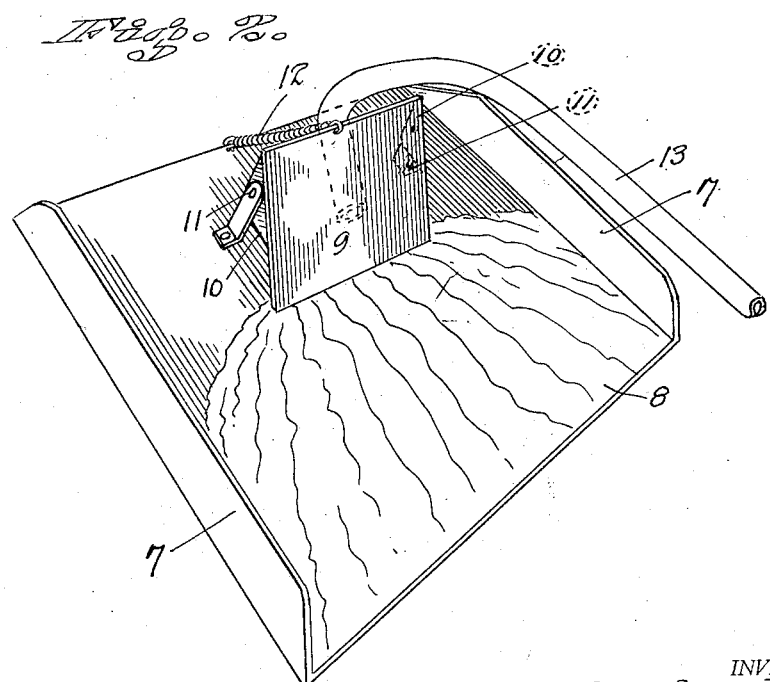
INVENTORS
ROBERT BROOKS TAYLOR
BENJAMIN B. HENDERSON AND
BY OLAF R. OLSEN
ATTORNEYS.

Patented May 24, 1932

1,859,724

UNITED STATES PATENT OFFICE

ROBERT BROOKS TAYLOR, OF KAPAA, AND BENJAMIN B. HENDERSON AND OLAF R. OLSEN, OF LIHUE, TERRITORY OF HAWAII

JUICE DISTRIBUTOR

Application filed January 6, 1930. Serial No. 418,939.

The present invention relates to improvements in juice distributors, and its principal object is to provide a simple means for evenly distributing juice obtained from sugar cane milling operations over cane fibre in preceding milling operations for the purpose of effecting a more thorough extraction of the sugar juice.

In the process of extracting juice from sugar cane, it is customary to squeeze the sugar cane in a number of different operations or stages, each of the operations or stages serving to extract additional juice from the remaining cane fibre.

It is found advantageous, particularly in the latter stages, to add a liquid to the fibre prior to the compressing of the same for more thoroughly extracting the small amounts of sugar juice still present. In the last stage it is customary to use water for this purpose, whereby a mixture of sugar juice, water, and fibre is obtained, and this mixture is used for wetting the fibre of the preceding operation. In the same manner the juice resulting from this operation may be mixed into the fibre of the next preceding operation.

When adding this mixture to the fibre, it is quite difficult to insure a proper and even distribution of the mixture over the fibre, and various devices of more or less complicated nature have been used for this purpose. One of the main difficulties encountered is to provide a means for evenly distributing the mixture that will not be disturbed by the fibre within the mixture which has a tendency to form into agglomerations which are hard to accommodate in the distributors used at the present time, and which interfere with a uniform distribution of the mixture.

Our invention provides a simple solution for this problem and is expressed in a simple device that is inexpensive and is not affected by accumulations of fibre as heretofore described.

The preferred form of our invention is illustrated in the accompanying drawings, in which Figure 1 shows our distributor in longitudinal section and in its proper position relative to one of the mills employed in the operation, and Figure 2 shows a perspective view of our distributor.

While we have shown only the preferred form of the invention, we wish to have it understood that various changes or modifications may be made within the scope of the claims hereto attached without departing from the spirit of the invention.

The mill comprises three rollers 1, 2 and 3, the former two being mounted in spaced and parallel relation in a horizontal plane, and the third roller being mounted above the two others and in fairly close engagement therewith so that sugar cane coming from the preceding mill on the chute 4 is fed between the rollers and emerges on top of roller 2 to be discharged into the flume 5 in which is mounted an endless conveyor 6 which carries the fibre to the next mill.

Our distributor 7 is disposed above this flume, and is intended to mix the juice gained from a later operation into the cane fibre discharged from the mill shown. It comprises a shallow trough 8 of substantially the same width as the flume 5 and mounted on an incline so that juice discharged thereon will gravitate into the flume and mix with the cane fibre.

In the trough 7 there is provided a baffle plate 9 which has two rearwardly-extending arms 10 pivoted to small brackets 11 rising from the bottom of the trough so that normally the baffle plate rests on the bottom of the trough in substantially upright position. The baffle plate is of considerably less width than the trough, as indicated in the drawing, occupies a central position between the side walls of the trough, and is somewhat closer to the upper end than to the lower end of the same. A tension spring 12 connects the upper end of the baffle plate with the upper end of the trough, and has a tendency to swing the baffle plate on its hinge so as to lift the bottom edge thereof, this spring, however, not being strong enough to actually lift the plate. The juice, or rather the mixture of juice, water, and cane fibre resulting from a later operation, is fed back to the trough through a pipe 13 by means of a pump not shown in the drawings, and is discharged into the space between the baffle plate and the bottom of the trough so as to impinge upon the baffle plate. The latter, which offers a certain amount of resistance to the passing of the mixture underneath the same, causes the mixture to spread all over the bottom of the trough in the manner indicated in Figure 2, and causes the mixture to be evenly and uniformly distributed over the cane fibre within the flume 5. If the fibres contained in the mixture accumulate into solid balls or plugs, the baffle plate yields and allows such ball or plug to pass underneath the same, the spring 12 aiding in this operation.

It will be seen that in this manner the mixture of juice, water and fibre is evenly distributed over the cane fibre emanating from the mill so that the latter is wetted throughout and may be more effectively compressed in the next operation for extracting additional sugar juices. The mixture discharged into the angle formed by the bottom of the trough and the baffle plate is evenly distributed over the entire surface of the trough, and accumulations of fibre will pass readily underneath the baffle plate so as not to create any disturbance or interruption in the even and uniform distribution of the mixture over the cane fibre.

We claim:

1. A juice distributor of the character described, comprising an inclined trough, a baffle plate having arms extending rearwardly therefrom, means for pivotally connecting the arms to the trough whereby the plate is made to stand on the trough in substantially upright position, and means for discharging the juice rearwardly of the baffle plate.

2. A juice distributor of the character described, comprising an inclined trough, a baffle plate having arms extending rearwardly therefrom, means for pivotally connecting the arms to the trough whereby the plate is made to stand on the trough in substantially upright position, and means for discharging the juice rearwardly of the baffle plate with a spring connecting the upper edge of the baffle plate to the trough for aiding the juice in slightly lifting the plate.

3. A juice distributor of the character described, comprising an inclined trough, a baffle plate mounted thereon so as to yieldingly bear on the trough with one edge thereof, means for discharging the juice rearwardly of the baffle plate, and means for assisting the juice to lift the baffle plate thereby allowing the latter to spread the juice laterally and evenly over the entire surface of the trough.

4. A juice distributor of the character described, comprising an inclined trough, a baffle plate pivoted thereto so as to stand in substantially upright position, means for discharging the juice rearwardly of the baffle plate, and means assisting the juice to lift the baffle plate thereby allowing the juice to spread evenly over the entire surface of the trough.

5. A juice distributor of the character described, comprising an inclined trough, a baffle plate mounted thereon so as to yieldingly bear on the trough with one edge thereof, and means for discharging the juice rearwardly of the baffle plate, the baffle plate being of less width than the trough so as to allow part of the juice to pass underneath the same and to cause the remainder of the juice to pass around the same.

6. A juice distributor of the character described, comprising an inclined trough, a baffle plate mounted thereon so as to yieldingly bear on the trough with one edge thereof, means for discharging the juice rearwardly of the baffle plate, and means for assisting the juice to lift the baffle plate, the latter being of less width than the trough so as to allow part of the juice to pass underneath the same, and to cause the remainder of the juice to pass around the same.

ROBERT BROOKS TAYLOR.
BENJAMIN B. HENDERSON.
OLAF R. OLSEN.